D. N. BALDERSTON.
GENERATOR SUSPENSION.
APPLICATION FILED SEPT. 22, 1916.
1,397,122.
Patented Nov. 15, 1921.
2 SHEETS—SHEET 1.
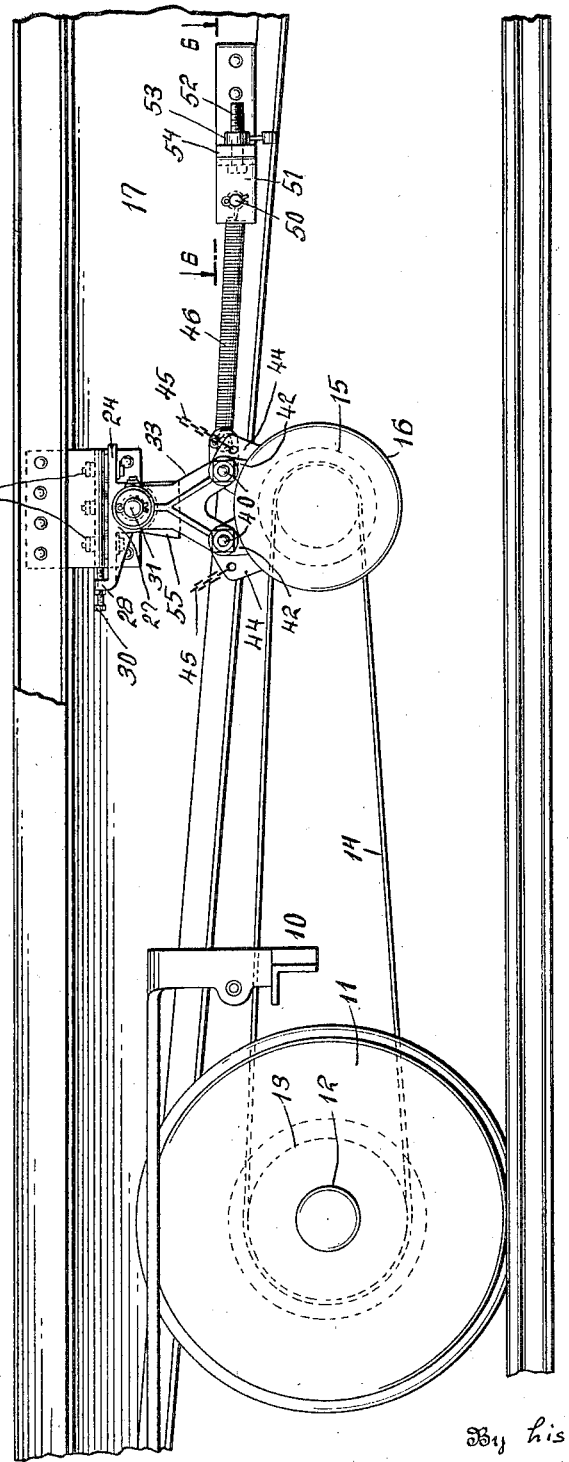
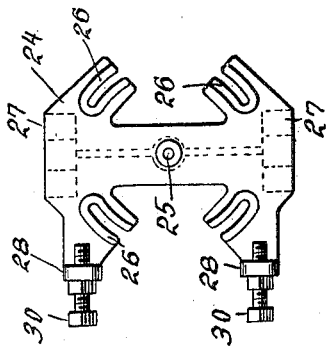
David N. Balderston, Inventor
By his Attorneys
Pennie, Davis & Marvin.

D. N. BALDERSTON.
GENERATOR SUSPENSION.
APPLICATION FILED SEPT. 22, 1916.
1,397,122.
Patented Nov. 15, 1921.
2 SHEETS—SHEET 2.
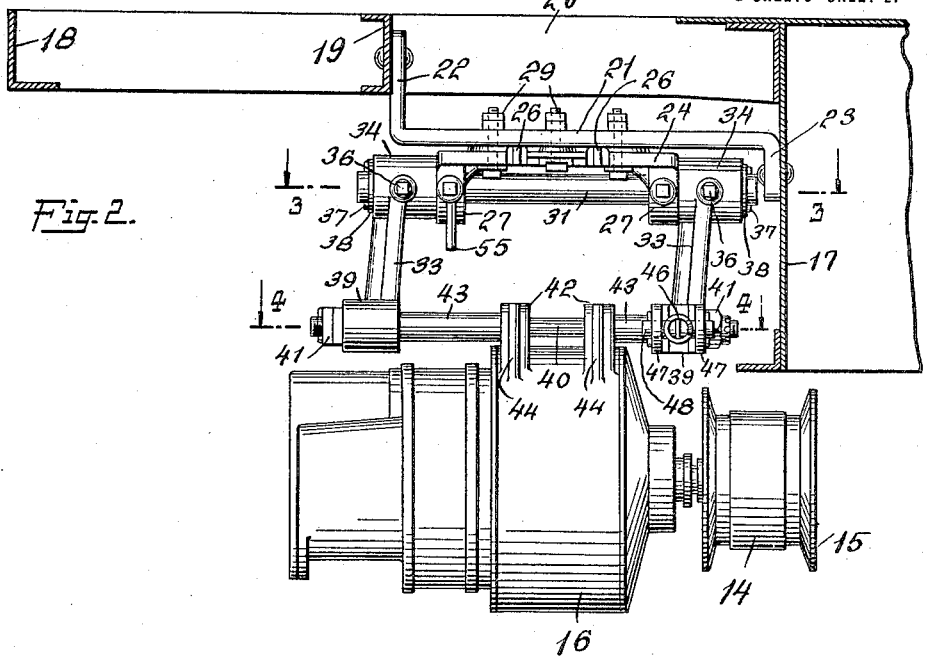
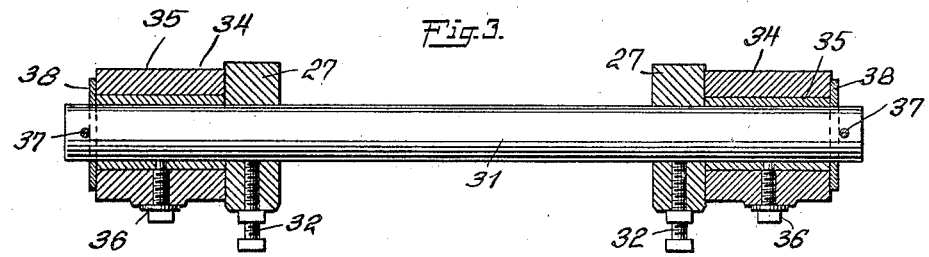
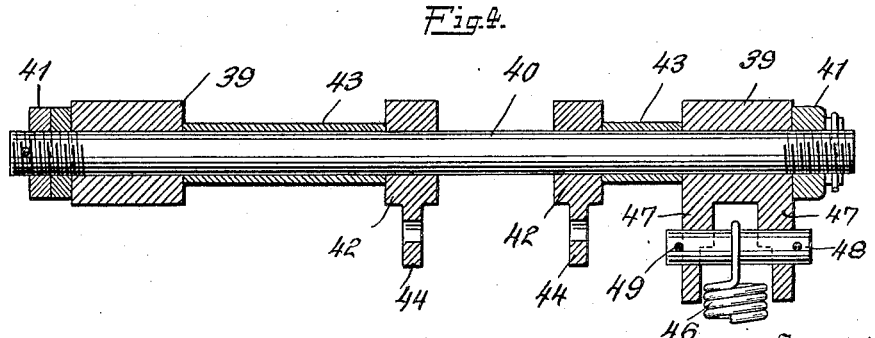
Inventor
David N. Balderston,
By his Attorneys
Pennie, Davis & Marvin.

UNITED STATES PATENT OFFICE.

DAVID N. BALDERSTON, OF PHILADELPHIA, PENNSYLVANIA, ASSIGNOR, BY MESNE ASSIGNMENTS, TO ELECTRO DYNAMIC COMPANY, A CORPORATION OF NEW JERSEY.

GENERATOR SUSPENSION.

1,397,122.  Specification of Letters Patent.  Patented Nov. 15, 1921.

Application filed September 22, 1916. Serial No. 121,535.

*To all whom it may concern:*

Be it known that I, DAVID N. BALDERSTON, a citizen of the United States, residing at Philadelphia, county of Philadelphia, State of Pennsylvania, have invented certain new and useful Improvements in Generator Suspensions; and I do hereby declare the following to be a full, clear, and exact description of the invention, such as will enable others skilled in the art to which it appertains to make and use the same.

This invention relates to a generator suspension and particularly to a form adapted to suspend from a car body, an axle-driven car lighting generator or a similar piece of apparatus.

In present types of steel passenger car construction the under frame comprises a relatively deep and wide center sill extending from end to end of the car. Parallel to the center sill are a number of side sills braced with each other and the center sill by means of bolsters. Owing to the amount of space occupied by the large center sill, the brake rigging and other mechanism suspended from the under frame, the space available for a body hung generator is limited. It is necessary that this piece of apparatus be placed at a sufficient distance from the car axle from which the dynamo is driven so that relative motion between the truck and the car body will at all times be compensated for by changes in the position of the generator with the minimum movement of the latter and without any danger of the driving belt running off either of the pulleys. It is also essential that the generator suspension be simple in construction and yet permit all necessary adjustments to properly aline the axis of the generator with the car axle. It is also important that means be provided for maintaining the tension of the belt substantially constant irrespective of variations due to relative movement between the truck and the car body and also to compensate for minor variations in the length of the driving belt which occur from time to time due to stretching of the belt or any other cause.

It is the object of the present invention to provide a generator suspension meeting all of the above requirements and in addition possessing an indicating device whereby variations in position of the dynamo from its normal position may be readily observed to the end that those having supervision of the equipment may know that the length of the belt should be altered or other adjustments made to restore the generator to the position which it should normally occupy.

Other objects and advantages of the invention will be apparent from a detailed description of a preferred embodiment of the same such as is shown in the accompanying drawings, in which—

Figure 1 is a side elevation of a portion of the under frame of a car showing the invention applied thereto;

Fig. 2 is an elevation at right angles to the view of Fig. 1 and showing some of the sills of the car frame in section;

Fig. 3 is a sectional view along the line 3—3 of Fig. 2;

Fig. 4 is a sectional view along the line 4—4 Fig. 2;

Fig. 5 is a plan view of a part of the suspension; and

Fig. 6 is a detail view of the retaining means for one end of the tension spring.

Referring now to the drawings, in which similar reference characters denote similar parts throughout the several views thereof, 10 indicates in somewhat simplified showing a portion of the truck frame which is mounted upon wheels 11 in any well known manner, not shown in the drawing. Upon the axle 12 of the wheels is a pulley 13 which by means of a belt 14 is connected to a pulley 15 of a car lighting generator 16, or other piece of axle-driven apparatus. The center sill of the under frame is shown at 17. Parallel with this sill are side sills 18 and 19, the entire frame being braced by bolsters 20. 21 represents a base member having an upturned end 22 attached to the side sill 19 and a downturned end 23 attached to the side of the center sill 17. The base member is of course attached at a point sufficiently distant from the car axle to maintain the generator at the proper distance and at the same time to clear any of the brake rigging or other mechanism in the vicinity of the truck.

Attached to the base member is a suspension bracket 24, the form of which is shown most clearly in Fig. 5. It comprises a central portion with an aperture 25 and end extensions with slots 26 each being formed as arcs of a circle having the aperture 25 as a center. The suspension bracket is also provided with depending members or lugs 27 and upstanding lugs 28. The suspension bracket is attached to the base member by bolts 29 or other fastening devices, one of which passes through the base member and the aperture 25 while the others pass through the base member and the slots 26. By loosening the latter bolts the suspension bracket may be rotated around the central bolt as a pivot point to secure any desired degree of adjustment of the axis of the generator. As a supplement to the retaining bolts which pass through the slots 26 the upstanding lugs 28 are provided with set-screws 30 which bear against the edge of the base member, as shown in Fig. 1. These set-screws may be retained in any position of adjustment by the usual lock nuts. Each of the depending lugs 27 is formed with an aperture through which passes a pivot shaft 31 extending beyond the lugs and clamped in position by set-screws 32 provided with the usual lock nuts. On the shaft is suspended a swinging frame composed of depending hangers 33 formed in the shape of inverted Y's, at the upper end of which are enlarged bearing sleeves 34 fitting over the ends of the pivot shaft. Preferably a piece of tubing 35 is inserted between the shaft and the bearing sleeve and retained in position with respect to the sleeve by a screw 36. By this construction the wear is taken up on the tube and not upon the sleeve. The tube can be easily and cheaply replaced. The bearing sleeves are retained in position against the sides of the lugs 27 by cotter pins 37 and washers 38. The lower extremities of the hangers 33 are formed with enlarged sockets 39 through which pass cross-bars or hanger-shafts 40 retained in position by nuts 41. The casing of the generator is provided with a number of lugs 42 having apertures through which the hanger-shafts 40 pass. To prevent displacement of the generator longitudinally of the hanger-shafts spacing sleeves 43 are provided. The generator lugs 42 are formed with ribbed extensions 44 to which chains 45 are attached. These chains are fastened to any convenient point on the under frame of the car and serve to prevent the generator dropping upon the tracks in case any part of the suspension breaks.

The tension of the driving belt 14 is maintained by means of a spring 46, which at one end is connected to the hanger 33 which lies nearer the center sill. As shown most clearly in Fig. 4 this hanger is provided with a pair of lugs 47 within which a pin 48 is held in place by cotter pins 49. One end of the spring is attached to pin 48. The other end of the spring is attached to a similar pin 50 fastened in a U-shaped clevis 51 which, by means of a bolt 52 and nut 53, is attached to a bracket 54 which is bolted to one side of the center sill. The spring is of a construction that permits it to maintain substantially constant tension throughout the ordinary variations in position of the generator. Preferably the length of the belt should be fixed so that the normal position of the generator under the influence of spring 46 is one that causes the generator to assume substantially the same position it would if hanging freely. With this normal relationship when the car is on a straight track it will be seen that, if the car is rounding a curve so that the truck shifts slightly with respect to the car body, the generator will be drawn slightly toward the car truck, while if for any reason the belt lengthens the tension spring will cause the generator to be drawn away from the truck.

In order to provide a device whereby those having supervision of the equipment may readily determine when the suspension needs adjustment or the belt should be altered in length there is associated with the lug 27, which is nearer the outside of the car, a member 55 formed with diverging edges as shown in Fig. 1. If these edges can be seen on both sides of the upper or stem portion of the outer hanger 33 the inspector will know that the generator occupies substantially its normal position.

As shown in Fig. 2, the bottoms of the hangers 33 are slightly displaced with respect to the tops thereof in order to provide a proper clearance between the ends of the hanger supports 40 and the center sill of the car frame. By having the swinging frame upon which the generator is carried of the form shown a space is provided within the frame through which part of the brake rigging may be extended, thus still further increasing the adaptability of the apparatus to fit upon the car frame without interfering with any of the other parts suspended therefrom. Whenever it becomes necessary to adjust the axis of the generator with respect to the car axle it is only necessary to loosen the retaining bolts 29 and to bring the generator into proper position by altering the positions of the set-screws 30, after which the retaining bolts are again tightened to clamp the suspension bracket 24 securely in place.

It will be understood that while a generator suspended to the under frame of a steel car has been shown, the invention is not to be limited to this construction as the suspension may, with slight modification of the base member 21 and the bracket 54, be adapted for attachment to the under frames of wooden cars. It is also to be understood that the suspension is not necessarily limited to use in supporting a car lighting generator but may be used for other apparatus that may be driven from the car axle or for a motor for driving the car. It will also

Having thus described my invention, what I claim is:

1. Means for suspending a dynamo from the under frame of a car, comprising a base attached to the frame, a bracket provided with depending lugs and upstanding lugs and having a central aperture and a plurality of slots disposed concentrically about said aperture, fastening means passing through said base and said aperture and slots, adjusting means associated with said upstanding lugs adapted to engage said base, a shaft passing through said depending lugs, hangers provided with bearings upon said shaft, cross-bars attached to said hangers, a dynamo provided with lugs engaging said bars, a tensioning device attached to one of said hangers and to the frame of the car, and means for altering the tension of said device.

2. Means for suspending a dynamo from the under frame of a car, comprising a base attached to the sills of the frame, a supporting bracket provided with a pair of depending lugs and a pair of upstanding lugs and having a central aperture and a plurality of slots disposed concentrically about said aperture, bolts passing through said base and said aperture and slots, adjusting screws passing through said upstanding lugs and adapted to engage said base, a shaft passing through said depending lugs, means for clamping the shaft in position within said lugs, hangers provided with bearing portions upon the ends of said shaft, means for retaining said bearing portions in position upon said shaft, sockets formed on the lower extremities of said hangers, hanger-shafts inserted within said sockets, a dynamo provided with lugs surrounding said hanger-shafts, spacing sleeves for preventing longitudinal movement of said lugs on said hanger-shafts, a tensioning spring attached to one of said hangers and to a sill of the car, and means for altering the tension of said spring.

3. The combination with a car truck and a car body having a center sill and side sills, of a base attached to the center sill and one of the side sills, a supporting bracket adjustably mounted upon said base, hangers pivotally suspended from said supporting bracket, shafts attached to said hangers, a dynamo suspended from said shafts, a belt connecting said dynamo and an axle of said truck, and means connected to one of said hangers and to the said center sill for maintaining the tension of said belt substantially constant.

4. The combination with a car truck and a car body having a center sill and side sills, of a base member having an upturned portion attached to one of said side sills and a depending portion attached to said center sill, a supporting bracket having a central aperture and a plurality of slotted apertures concentric about said central aperture, retaining means passing through said base member and said apertures, a shaft mounted upon said supporting bracket, hangers mounted upon the ends of said shaft and so formed that their bottom portions are displaced with respect to their upper portions away from said center sill, hanger shafts attached to the lower ends of said hangers, a dynamo mounted upon said hanger-shafts and tensioning means connected to one of said hangers and to the side of said center sill.

5. A dynamo suspension comprising, in combination, a base attached to the bottom of a car, a supporting bracket adjustably secured to said base and provided with depending lugs, a shaft supported in said lugs, hangers provided with stem portions supported at their upper ends upon said shaft, cross-bars connecting the lower ends of said hangers, a dynamo suspended from said cross-bars and a member associated with one of said depending lugs and formed with diverging edges adapted to serve in conjunction with the stem portion of one of said hangers as an indicator to show displacements of said generator from its normal position.

6. A bracket for supporting a dynamo from a car body, comprising a plate formed with a central portion having an aperture therein adapted to receive a supporting bolt, and extensions at the ends of said central portion provided with slots disposed concentrically about said aperture and adapted to receive supporting bolts.

7. A bracket for supporting a dynamo from a car body, comprising a plate formed with a central portion having an aperture therein adapted to receive a supporting bolt, and extensions at the ends of said central portion, each of said extensions being provided with slots disposed concentrically about said aperture and adapted to receive supporting bolts, said plate also having attached thereto a plurality of depending lugs adapted to receive a shaft.

8. A bracket for supporting a dynamo from a car body, comprising a plate formed with a central portion having an aperture therein adapted to receive a supporting bolt, and extensions at the ends of said central portion, each of said extensions being provided with slots disposed concentrically about said aperture and adapted to receive supporting bolts, said plate also having attached thereto a plurality of depending lugs adapted to receive a shaft and a plurality of upstanding lugs adapted to receive adjusting screws.

9. Means for retaining the end of a tensioning spring for a car lighting dynamo comprising a U-shaped clevis, a pin in said clevis to which one end of the spring is attached, a bracket adapted to be attached to the car frame, a bolt passing through the base of said clevis and said bracket and an adjusting nut on said bolt.

10. An indicating device for car-lighting dynamo suspensions comprising a depending member attached to a fixed portion of the suspension and formed with diverging vertical edges and an inverted dynamo supporting hanger pivoted to a fixed portion of the suspension and having a stem portion of lesser width than said depending member whereby said stem portion may serve in conjunction with said diverging edges as an indicator of the displacements of said hanger relative to the fixed portion of the dynamo suspension.

11. Means for suspending a dynamo from the body of a car, comprising in combination, a base attached to the car, a supporting bracket pivotally mounted upon said base and provided with depending members, means pivotally mounted in said depending members for supporting the dynamo thereon, a driving belt connecting said dynamo and an axle of the car truck, and means for swinging said dynamo away from the axle to tension the driving belt.

12. Means for suspending a dynamo from the body frame of a car, comprising, in combination, a base attached to the frame, a bracket having a plurality of slots therein and provided with depending members and upstanding lugs, fastening means passing through said base and slots, adjusting means associated with said upstanding lugs and adapted to engage said base for adjusting the dynamo relative to the car axle, a shaft supported by said depending members, and means for suspending a dynamo from said shaft.

13. Means for suspending a dynamo from the under frame of a car, comprising a base attached to the frame, a bracket having a plurality of concentrically disposed slots therein and provided with depending members and upstanding lugs, fastening means passing through said base and slots, adjusting means associated with said upstanding lugs and adapted to engage said base for adjusting the dynamo relative to the car axle, a shaft supported by said depending members, and means for suspending a dynamo from said shaft.

14. Means for suspending a dynamo from the under frame of a car, comprising a base attached to the frame, a bracket provided with depending members and upstanding lugs and having a central aperture and a plurality of slots disposed concentrically about said aperture, fastening means passing through said base and said aperture and slots, adjusting means associated with said upstanding lugs adapted to engage said base for adjusting the dynamo relative to the car axle, a shaft between said depending members, and means for suspending a dynamo upon said shaft.

15. A bracket for supporting a dynamo from a car body, comprising a plate having a central aperture therein adapted to receive a supporting bolt, and a plurality of slots disposed concentrically about said aperture and adapted to receive supporting bolts, thereby permitting extensive angular adjustment of said plate about its central axis, and members depending from said plate for supporting the dynamo.

16. A bracket for supporting a dynamo from a car body comprising a plate having a central aperture adapted to receive a supporting bolt and a plurality of slots near the ends of said plate adapted to receive supporting bolts, thereby permitting extensive angular adjustment of said plate about its central axis, and members depending from said plate for supporting the dynamo.

17. A bracket for supporting a dynamo upon a car body, comprising a plate having a central aperture therein adapted to receive a supporting bolt and a plurality of slots disposed concentrically about said aperture and adapted to receive supporting bolts, thereby permitting extensive angular adjustment of said plate about its central axis, members depending from said plate for supporting the dynamo, and upstanding lugs adapted to receive adjusting screws for adjusting the dynamo relative to the car axle.

18. A bracket for supporting a dynamo from a car body comprising a plate formed with a central portion having an aperture therein adapted to receive a supporting member and extensions at the ends of said central portion, said extensions being provided with slots disposed concentrically about said aperture and adapted to receive supporting members.

19. An indicating device for car lighting dynamo suspensions comprising a depending member attached to a fixed portion of the suspension and formed with diverging vertical edges and an inverted dynamo supporting hanger pivoted to a fixed portion of the suspension and having a stem portion of lesser width than the depending member, whereby the stem portion may serve in conjunction with said diverging edges as an indicator of the displacements of said hanger relative to the fixed portion of the dynamo suspension.

In testimony whereof I affix my signature.

DAVID N. BALDERSTON.